United States Patent [19]

Smith

[11] 3,886,052

[45] May 27, 1975

[54] METHOD OF MAKING A MAGNETIC RECORDING DISC

[75] Inventor: Robert Samuel Smith, San Jose, Calif.

[73] Assignee: Digital Equipment Corporation, Maynard, Mass.

[22] Filed: Feb. 12, 1973

[21] Appl. No.: 331,646

Related U.S. Application Data

[63] Continuation of Ser. No. 56,555, July 20, 1970, abandoned.

[52] U.S. Cl..................... 204/33; 29/195; 204/37 R; 204/38 A; 204/42; 204/40; 148/6.3; 340/174

[51] Int. Cl.............................................. C23b 5/62

[58] Field of Search............ 204/29, 37 R, 42, 38 A, 204/33; 29/195 M; 117/236, 237, 239; 340/174 TF

[56] References Cited

UNITED STATES PATENTS

| | | | |
|---|---|---|---|
| 3,327,297 | 6/1967 | Croll | 117/236 |
| 3,353,166 | 11/1967 | Brock | 179/100.2 A |
| 3,468,765 | 9/1969 | McConnell | 204/42 |
| 3,471,272 | 10/1969 | Wilhelm et al. | 204/29 |
| 3,719,525 | 3/1973 | Patel et al. | 117/237 |

*Primary Examiner*—John H. Mack
*Assistant Examiner*—W. I. Solomon
*Attorney, Agent, or Firm*—Lowhurst, Aine & Nolan

[57] ABSTRACT

A magnetic recording disc and method of making the same is disclosed wherein a prepared aluminum substrate is first anodized and then plated with a nonmagnetic copper alloy to provide an electroplatable surface. The disc is then electroplated with a ferromagnetic material and heat treated to form a thin oxide over the outer surface which provides a hard, wear resistant coating for the disc.

13 Claims, 7 Drawing Figures

PATENTED MAY 27 1975

3,886,052

INVENTOR.
ROBERT S. SMITH
BY [signature]
ATTORNEY

METHOD OF MAKING A MAGNETIC RECORDING DISC

This is a continuation of application Ser. No. 56,555, filed July 20, 1970, and now abandoned.

BACKGROUND OF THE INVENTION

The present invention relates generally to magnetic recording apparatus and, more particularly, to a method of making a magnetic recording disc having substantially uniform tenacity between the recording medium and the carrying substrate over the entire recording surface.

Magnetic recording discs of the type presently used in random access storage files for computers and commercial television slow motion and stop-action systems are typically mounted and spun at high rotational speed so that they may be scanned by a magmetic head which is swiftly moved radially across the spinning disc to apply or read-out data signals. The magnetic head in such systems is typically mounted a few microinches above the disc surface and frequently makes contact with the disc surface riding thereupon for a short distance. Because of the high relative speeds between recording head and disc surface, it is extremely important that the disc surface not only have a high wear component and extremely high smoothness characteristics, but the thin films making up the recording surface must have a uniform and strong tenacity to the carrying substrate in order to prevent them from being torn away from the substrate surface.

In addition to the possible physical damage to the disc which might occur during use as a result of a bonding defect or adhesive nonuniformity between the ferromagnetic layer and the substrate, the effect of the defect on the recording function must also be considered since it is well known in the art that the response of a precision magnetic recording medium is closely tied to the physical characteristics of the particular medium utilized.

Several examples of various recording disc configurations and methods of making the same are disclosed in the U.S. Pat. No. 3,353,166 to Brock which is directed to a magnetic recording member having a thin protective nonmagnetic oxide film forming a wear resistant surface. The disclosure of this patent, is accordingly, expressly incorporated into this application as background disclosure.

Recording discs provided in accordance with the Brock teaching and other prior art methods are typically made by plating a nickel-cobalt layer onto a brass or aluminum substrate and then oxidizing the nickel-cobalt to provide a hard outer surface which is highly wear resistant. Where brass is used for the substrate, it is relatively easy to plate a suitable ferromagnetic layer onto the disc. However, where the lighter aluminum substrate is used so as to take advantage of the lower mass properties of aluminum, one of the problems which is encountered is the difficulty of obtaining a uniform electroplate adhesion to the substrate. Although aluminum is generally a difficult metal to electroplate, since the adhesion thereto of the plated metal is very poor, plating can be accomplished using several techniques.

Nickel-cobalt and iron can be directly plated onto an aluminum substrate. This process comprises placing the aluminum substrate in the electroplating bath containing the plating ion and an anodizing acid such as sulfuric acid or boric acid. In the first step of the process, the current is reversed so as to anodize the aluminum substrate and cause an oxide to form on the surface to be plated. Next, the current is applied in the normal electroplating direction and the metal plate is deposited on the oxide surface of the aluminum substrate.

In another prior art method, the aluminum surface is initially prepared by zincating followed by a copper strike or some other undercoating technique which provides a surface layer which can be electroplated. The disc is then plated with a layer of ferrous metal which constitutes the recordable medium. Still another method is to apply an electroless nickel directly to an aluminum substrate and then deposit a nickel-cobalt layer thereupon.

No matter what method is used to deposit the ferromagnetic metal layer onto the substrate, some means must be provided for hardening the outer surface so as to give it an acceptable wear characteristic. This is typically accomplished using one of two methods: (1) by heat treating the plated disc so as to form an oxide on the surface as disclosed in the above mentioned Brock patent, or (2) by using rhodium as an outer surface layer.

However, where the first method is used the heat required to form the oxide may undesirably affect the disc. For example, where there is a nonuniformity in the adherence of the plating to the aluminum substrate, microscopic blisters may be formed during the high temperature oxidizing stage. Even two or three microscopic bubbles appearing in a high quality recording disc will render the disc unsuitable since such bubbles are not only capable of causing injury to the recording head, but may result in "drop outs" or "drop ins" which are not permitted in certain applications. If an electroless nickel method of plating is used, the nickel in the lower layer may become magnetized during the oxidation step, so as to, in effect, provide a thick layer of magnetizable material when only a thin layer is desired.

Where rhodium is used to obtain the wear resistant outer surface, one disadvantage is the relatively high cost involved. Another disacvantage is that rhodium acts as a catalyst for the polymerization of organic vapors in the air such that organic deposits may build up on the disc and cause interferences between the disc and recording head. Still another disadvantage of rhodium is that, since the rhodium layer is highly stressed, the plating bath must be very closely controlled in order to obtain the desired hardness and tenacity of adhesion to the underlying magnetic layer.

OBJECTS OF THE PRESENT INVENTION

It is therefore a primary object of the present invention to provide a novel method of preparing a magnetic recording disc which is free of plating imperfections.

Another object of the present invention is to provide a novel method of plating a ferromagnetic material onto an aluminum substrate so as to provide uniform tenacity between the aluminum substrate and the plated material.

Still another object of the present invention is to provide a novel method of plating nickel-cobalt material onto an aluminum substrate such that the finished recording disc is free of microscopic adhesive imperfections between substrate and plated material.

Still another object of the present invention is to provide a simplified and relatively inexpensive method of manufacturing magnetic recording disc apparatus.

SUMMARY OF THE PRESENT INVENTION

In accordance with the present invention, a novel magnetic recording disc and method of manufacturing magnetic recording discs is described wherein an aluminum substrate is first anodized and then plated, such as electroplating with a nonmagnetic copper alloy and polished to provide an electroplatable surface. The disc is then electroplated with a ferromagnetic material and heat treated to form a thin oxide layer over the outer surface which provides a hard wear resistant coating for the disc.

One advantage of the present invention is that an extremely uniform bond is obtained between substrate and subsequent platings so that no subsurface blisters are formed during the oxidizing stage.

Another advantage is that the method of the present invention is relatively inexpensive as compared to other methods of obtaining an end product having similar characteristics.

These and other advantages of the present invention will undoubtedly become apparent to those skilled in the art after having read the following detailed description of a preferred embodiment which is illustrated in the drawing.

IN THE DRAWING

DETAILED DESCRIPTION OF A PREFERRED EMBODIMENT

Figure 1:
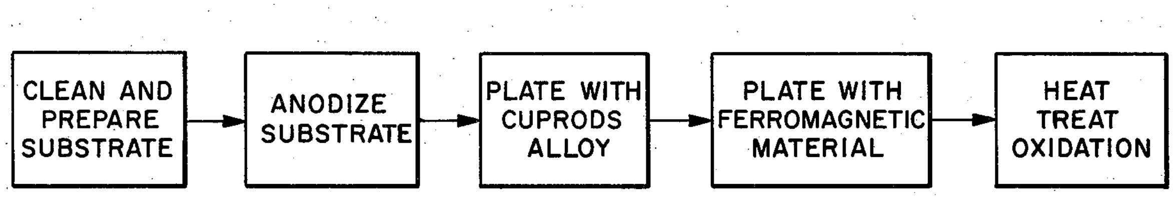
FIG. 1 is a block diagram illustrating the primary steps involved in carrying out the present invention.

Referring now to FIG. 1 of the drawing, a block diagram is provided to illustrate the principal operative steps followed in manufacturing a magnetic recording medium in accordance with the present invention. An aluminum substrate of a desired configuration is first cleaned and polished and then anodized to provide a thin porous film over the surface. The anodized substrate is then plated with a layer of copper alloy which is suitably finished to provide a good electroplatable surface. A relatively thin layer of ferromagnetic material is then electroplated to the copper alloy, and the plated composite is heat treated to grow a thin oxide layer upon the exterior surface so as to provide a hard, wear resistant protective covering for the recording medium.

Figures 2, 3, 4:
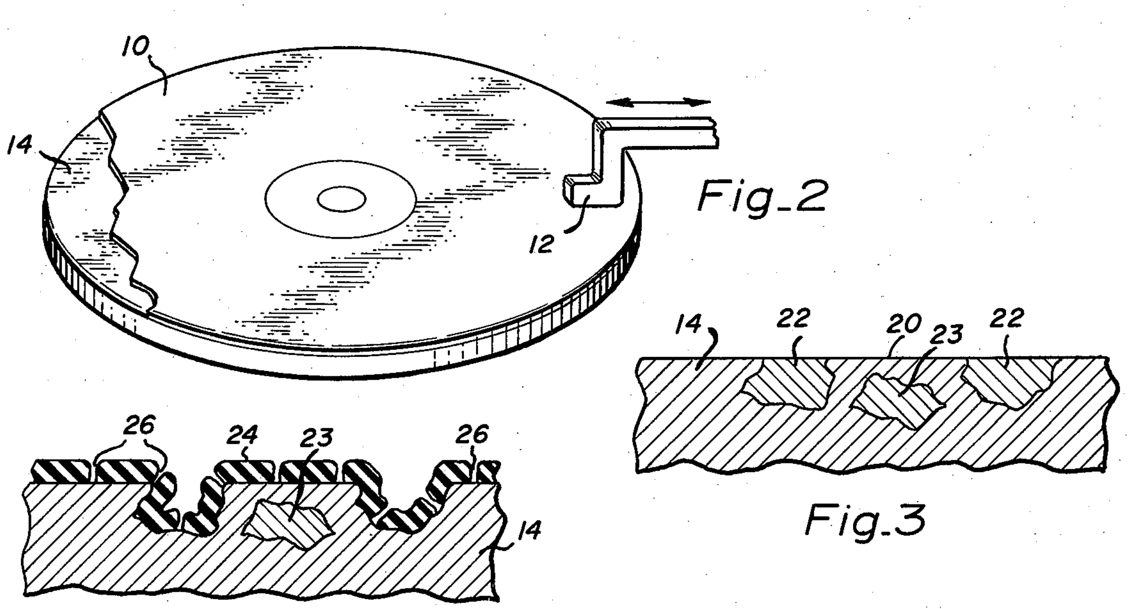
FIG. 2 illustrates one form in which the recording medium may be embodied.
FIG. 3 is a partial cross section showing the disc surface after the first polishing.
FIG. 4 is a partial cross section showing the disc surface after anodization.

In one embodiment the recording medium is in the form of a disc 10, as shown in FIG. 2 of the drawing, over the surface of which a recording head 12 will be caused to traverse. Since the head 12 is closely spaced from the disc 10 and is separated therefrom by only a thin film of air, the head is expected to, and does actually engage the outer surface of disc 10 on occasion. Because of this engagement, it is very important that the disc have certain qualities and characteristics which are pointed out above.

In accordance with the present invention, the aluminum supporting substrate 14 is turned on a lathe and polished so that the surface on one or both sides has a smoothness on the order of one half to three microinches in roughness. During this operation the disc is turned flat such that any bows in the surface are no larger than 50 to 100 microinches per inch as measured over the surface. After the disc has been turned and polished, the outer surface 20 takes on the smooth configuration illustrated in the partial cross section shown in FIG. 3 of the drawing. As indicated in FIG. 3, when the disc is polished smooth to at least the above mentioned specifications, the surface 20 typically includes small pockets of alloying constituents, or precipitates, such as shown at 22, some lying at the surface and some of which are immediately beneath the surface as at 23. Unless the precipitates are removed from the exposed pockets 22, it will not be possible to obtain a uniform adhesion between the subsequent plating and the substrate 14.

However, before the precipitates are removed, the polished substrate is scrubbed with a soap solution, such as Diversey 17 in a concentration of from 3 to 8 ounces per gallon, so as to remove any remnant greases, residues or particulate matter that might interfere with the later plating process. The disc is then mounted on a plating fixture and immersed into a tank of Diversey 17 and ultrasonically agitated for about 2 minutes at a temperature of 100°F. The disc is then removed and thoroughly rinsed.

The disc is now ready for removal of the precipitates and is immersed in a phosphoric acid solution which thoroughly cleanses the pockets 22 of precipitate while at the same time providing an anodizing operation which forms an oxide film 24 over the substrate surface. The anodized film 24 is approximately 15 microinches thick and has tiny pores 26 passing through it as is illustrated in FIG. 4 of the drawing. The disc is left in the bath and anodized at 15 volts for approximately 3 minutes. A preferred anodizing bath is comprised of an acid solution of from 5 to 20% phosphoric acid by volume.

This anodizing process differs from the conventional etch in that is cleans out the precipitate areas 22 without dissolving any appreciable amount of the aluminum surface and, instead, builds up the porous oxide layer 24 on the surface of the substrate. A conventional etch, on the other hand, tends to dissolve the surface aluminum and open the previously buried precipitate pockets 23 without removing all of the uncovered precipitates in which case the residue of the precipitate causes a variation in the degree of adhesion between a subsequent plating and the substrate. Where such variation in adhesion is permitted it is highly probable that during subsequent processing stages blisters or bubbles will be formed in the plating over the precipitate pockets rendering the disc unacceptable for its intended purpose.

I have found that through the use of phosphoric acid as the anodizing substance an anodized film 24 is developed upon the substrate surface whose pore size and pore density is conducive to an excellent plating adhesion. The pores 26 facilitate the later plating operation in that electrical current is allowed to pass through the anodized layer without subjecting the aluminum substrate to the plating solution. The plating solution is therefore not permitted to attack the aluminum although the plating material becomes firmly anchored to the substrate surface.

Although other anodizing acids may likewise be used, phosphoric acid has been found to do a very effective job of cleaning out the substrate precipitates so as to provide a completely anodized surface with no exposed aluminum. This means that a complete bonding between substrate and the subsequent copper plating can be obtained throughout the surface of the disc.

Figure 5:
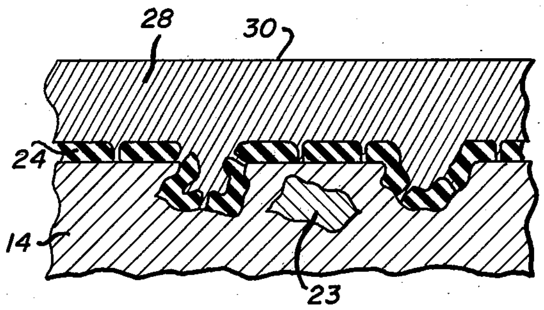
FIG. 5 is a partial cross section showing the disc surface after it is plated with a copper alloy.

Following anodization the substrate is again cleaned and rinsed and is then immersed in a copper plating bath consisting of, for example, copper sulfate (about 26 ounces per gallon) and sulfuric acid (about 1.6% by volume). The substrate is left in the copper bath for about 12 minutes to build up a copper film of from 150 to 500 microinches thickness on the disc surface. The disc is then removed from the bath, rinsed and again polished to provide the smooth surface 30 illustrated in FIG. 5 of the drawing.

Figure 6:
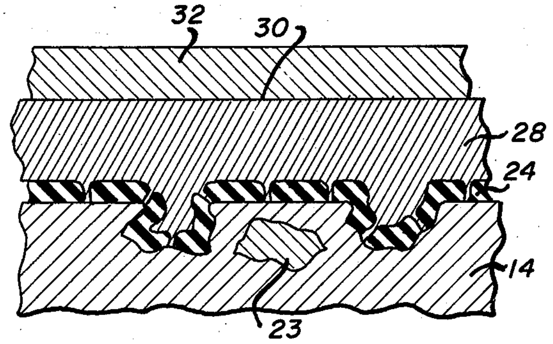
FIG. 6 is a partial cross section showing the disc surface after the ferromagnetic layer is formed over the copper alloy layer.

Following the second polishing operation, the disc is electrolytically cleaned in a suitable cleaning solution, such as Enbond 160, after which it is rinsed, and then dipped into an acid bath of 5% sulfuric acid. After being removed from the acid bath the disc is again rinsed with water and subsequently dipped into an activator, such as Puma C12. It is then again rinsed and quick dipped into sulfuric acid followed by another rinse. The disc is then immersed into a ferrous metal solution, such as nickel-cobalt, where it is plated for about 75 seconds at a current of 0.05 amps per square inch. At the completion of this plating step, a layer of nickel-cobalt 32, as is shown in FIG. 6 of the drawing, of about 10 to 20 microinches is provided on the outer surface of the disc. The disc is then dried by spinning at a high rate of speed.

Figure 7:
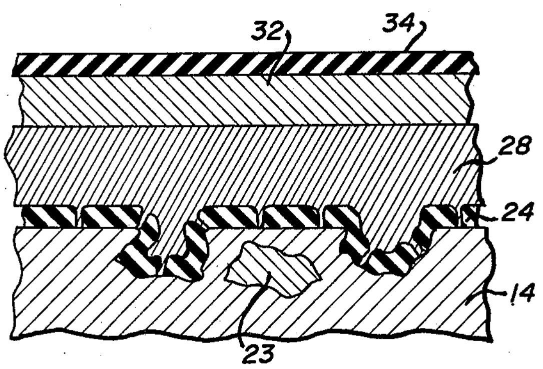
FIG. 7 is a partial cross section showing the disc surface after an oxide is grown over the ferromagnetic layer and the disc is in its final form.

After the disc is dried, it is put into a furnace and elevated to a temperature of about 570° for a period of 2½ hours during which time an oxide layer 34 of about 1–2 microinches thickness is grown on the surface of the nickel-cobalt layer 32 (see FIG. 7). The disc is then removed from the furnace and allowed to cool to room temperature. The disc may or may not be subjected to a light polish after oxidation.

Although a single preferred embodiment of the invention has been disclosed above, it is contemplated that certain modifications can be made without departing from the basic method and appartus of the invention. It is therefore to be understood that the above example is for purposes of illustration only and that the appended claims are to be interpreted to include all such modifications which fall within the true spirit and scope of the invention.

What is claimed is:

1. A method for producing a magnetic film on an aluminum substrate to form a magnetic information storage member which has information recorded thereon or read therefrom by a magnetic head while moving with respect to said head comprising the steps of polishing the surface of the aluminum substrate, cleaning the polished surface in a soap solution to remove residue and particulate matter, anodizing the substrate in a phosphoric acid solution to remove alloying precipitates from the surface of the aluminum and to form a porous oxide film on said surface, said pores extending through the oxide film surface to the aluminum surface, plating a film of copper on said porous oxide film surface, electroplating a layer of ferromagnetic material on said copper film to form said magnetic film, and heating said substrate at an elevated temperature for a selected time period to form an oxide layer on the surface of said ferromagnetic layer whereby a thin wear resistant surface is formed on said magnetic film.

2. The method as claimed in claim 1 wherein the storage member is movable relative to the magnetic head.

3. The method as claimed in claim 1 wherein the step of plating the film of copper on said oxide film comprises electroplating.

4. A method as claimed in claim 1 wherein said elevated temperature is about 570° F and said selected time period is at least 2½ hours.

5. A method as claimed in claim 1 wherein the step of polishing the surface of the aluminum substrate comprises polishing the surface to a smoothness of at least three microinches.

6. A method as claimed in claim 1 wherein said elevated temperature is about 570° F and said selected time period is at least 2½ hours.

7. The method as claimed in claim 1 wherein said ferromagnetic material comprises a nickel cobalt alloy.

8. A method for producing a magnetic film on an aluminum substrate to form a magnetic information storage member which has information recorded thereon or read therefrom by a magnetic head while moving with respect to said head comprising the steps of polishing the surface of the aluminum substrate to a smoothness of at least three microinches, cleaning the polished surface in a soap solution to remove residues and particulate matter, anodizing the substrate surface in a phosphoric acid solution to remove alloying precipitates from the surface of the aluminum and to form a porous oxide film on said surface, said pores extending through the oxide film surface to the aluminum surface, plating a film of copper on the oxide film surface from a copper plating bath containing copper sulfate and sulfuric acid, polishing the surface of said copper film, etching said copper film in an acid solution, electroplating a layer of ferromagnetic material on said copper film to form said magnetic film, and heating said substrate at an elevated temperature for a selected time period to form an oxide layer on the surface of said ferromagnetic layer whereby a thin wear resistant surface is formed on said magnetic film.

9. The method as claimed in claim 8 wherein the storage member is movable relative to the magnetic head.

10. The method as claimed in claim 8 wherein the step of plating the film of copper on said oxide film comprises electroplating.

11. A method as claimed in claim 8 wherein said elevated temperature is about 570° F and said selected time period is at least 2½ hours.

12. A method as claimed in claim 8 wherein said phosphoric acid solution is from 5 to 20% phosphoric acid by volume.

13. A method as claimed in claim 8 wherein said film of copper is from 150 to 500 microinches thick.

* * * * *